Aug. 19, 1941.  A. E. DRISSNER  2,252,839
FINGER HOLDER
Filed Feb. 21, 1939
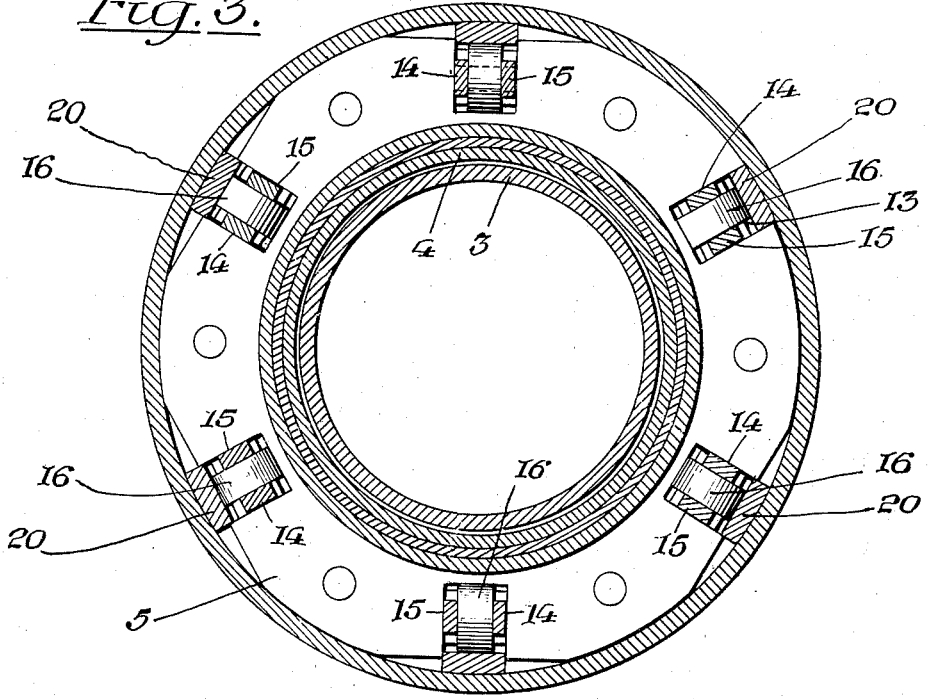
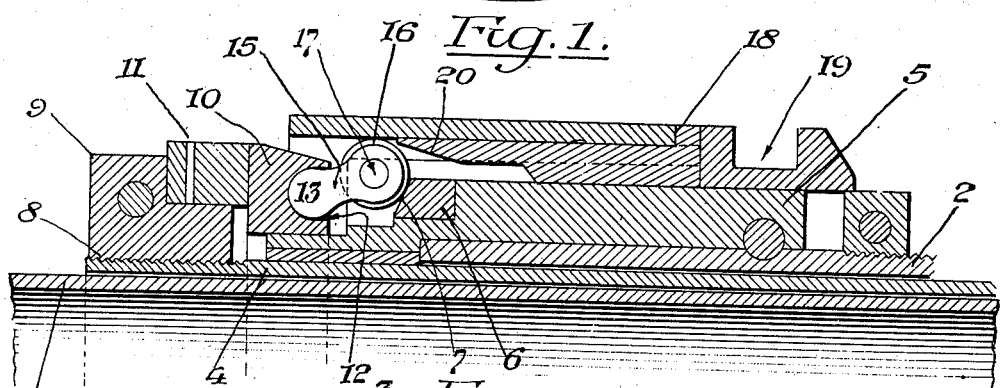
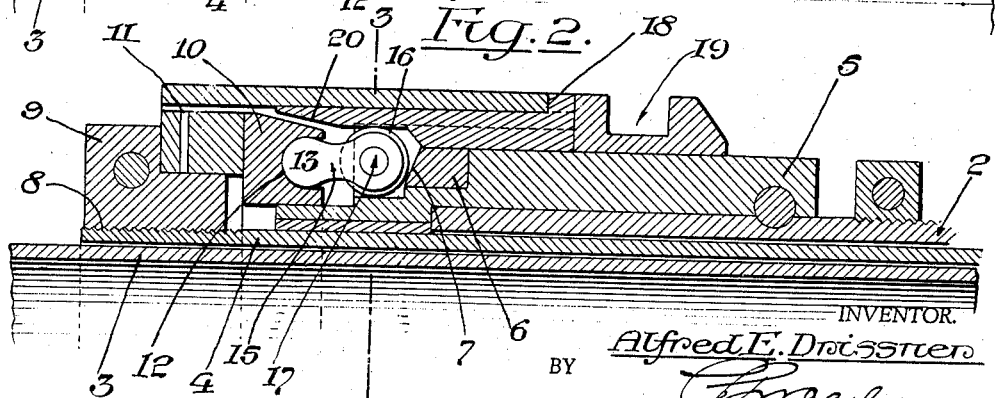
INVENTOR.
Alfred E. Drissner
BY
ATTORNEY.

Patented Aug. 19, 1941

2,252,839

UNITED STATES PATENT OFFICE 2,252,839

FINGER HOLDER

Alfred E. Drissner, Cleveland, Ohio, assignor to The National Acme Company, Cleveland, Ohio, a corporation of Ohio Application February 21, 1939, Serial No. 257,604

5 Claims. (Cl. 279—1)

This invention relates to finger holders for spindles adapted preferably to operate in conjunction with automatically operative chucks or collets, an object of the invention being to provide improved mechanism of this general character particularly designed for use with single and multiple spindle automatic screw machines and which will exert a great pressure on the chucks or collets to close them and maintain them in closed position on the stock with a comparatively slight pressure on and movement of the fingers and, therefore, especially applicable on machines having a limited space for the finger holders.

A further object of the invention is the provision of an improved mechanism of this character which will be simple and compact, efficient and effective in operation, economical to manufacture and which will eliminate entirely the use of springs or other inefficient mechanical means for operating the fingers to spread the same.

In the drawing accompanying and forming a part of this specification, Fig. 1 is a longitudinal sectional view of so much of this improved finger holder as is deemed necessary to an understanding of its construction and indicating the position of the fingers when the chucks or the collets are open.

Fig. 2 is a similar view illustrating the fingers in the position for maintaining the chucks or collets closed in stock gripping position, and Fig. 3 is a cross-sectional view taken on the line 3—3 of Fig. 2.

Similar characters of reference indicate corresponding parts in the several views.

Before explaining in detail the present improvement and mode of operation thereof, I desire to have it understood that the invention is not limited to the details of construction and arrangement of parts illustrated in the accompanying drawing since the invention is capable of other embodiments, and that the phraseology employed is for the purpose of description and not of limitation.

These finger holders, when applied to a multiple spindle machine, are located on the rear end of a tubular spindle 2 carried by the indexible work carrier in the usual manner.

In the present improvement the feed tube is indicated at 3 and the collet tube at 4. A sleeve or body member 5 is suitably secured to the spindle 2 and this sleeve carries a suitable collar 6 having a cam surface 7.

The rear of the collet tube 4 is provided with threads 8 to which is secured a nut 9, the threaded connection serving to permit adjustment of the pressure exerted on the chucks or collets. A ring member 10 which may be in one piece or two parts as indicated 11 is adapted suitably to abut against this nut 9 so that when the ring member is shifted against the nut, the action of the nut will serve to draw the collet tube in to close the chuck or collet on the work to be gripped as is usual in machines of this type.

Carried by the ring member 10 in a suitable socket 12 is a link or toggle member 13, thus practically forming a ball and socket joint, and this toggle member 13 comprises a pair of outer members or plates 14 and 15 having an enlarged or knuckle-formed end and having therebetween at the free end a roller 16 suitably carried by a pin 17. This roller 16 is adapted to engage the cam surface 7 of the collar 6. Thus, the shiftable socketed member 10 and the link 13 form a toggle enabling, as hereinafter stated, greater pressure to be exerted on the chucking mechanism with very little operating power and very little strain on certain parts of the spindle mechanism.

A sliding sleeve 18 having an annular recess 19 for engagement of a suitable shoe (not shown) is adapted to carry a tapered cam member 20 over the roller 16 by the shifting of the sleeve 18 longitudinally by means of the usual mechanism on machines of this kind. The shifting of this sleeve from the position shown in Fig. 1 to the position shown in Fig. 2 will cause the cam member 20 to depress the roller 17 along the cam surface 7 causing rotation of the link 13 in the socket 12 and as this link is carried into a position approximating the horizontal, the ring 10 and thereby the nut 9 will be moved rearwardly thereby drawing the collet tube in to clamp and hold the stock effectively.

When the sleeve 18 is shifted in the opposite direction releasing the pressure of the cam 20 on the roller 16, the roller will ride up the inclined surface of the cam 7 thereby releasing the pressure on the nut 9 and permit it together with the collet tube 4 to shift forwardly to release the stock bar from the grip of the collet.

Any suitable number of these fingers or link members are employed with each spindle depending upon the size of the stock to be chucked but in illustrating the present improvement six such links are shown in Fig. 3, each located in a recess of the fixed sleeve 5.

Due to the small space required for these finger holders or links, it is possible to use a larger capacity spindle with a machine of limited size and the toggle action of the links will enable greater pressure to be exerted on the chucking mechanism with very little operating power and, therefore, very little strain on the housing.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. A finger holder for a chuck or collet-carrying spindle and comprising a pair of opposed spaced members shiftable relative to each other and having the faces thereof opposed to each other formed one as a tapered cam face and the other with a substantially circular recess forming a socket, a toggle link having an enlarged end complemental to said circular recess and rotatably carried therein, thereby forming a toggle joint and having at its opposite end a roller engaging said tapered cam face, and shiftable means having a cam for engaging said roller at an angle to said opposed faces and effective to depress the roller along the tapered cam, thereby straightening the toggle and operating the chuck or collet.

2. A finger holder for a chuck or collet-carrying spindle and comprising a pair of opposed spaced members shiftable relative to each other and having the faces thereof opposed to each other formed one as a tapered cam face and the other with a substantially circular recess elongated transversely of the longitudinal axis of a toggle link and forming a socket, a toggle link comprising a pair of spaced links having enlarged ends complemental to said circular recess and rotatably carried therein, thereby forming a toggle joint and having at its opposite end a roller located between said links and engaging said tapered cam face, and shiftable means having a cam for engaging said roller at an angle to said opposed faces and effective to depress the roller along the tapered cam, thereby straightening the toggle and operating the chuck or collet.

3. A finger holder for a chuck or collet-carrying spindle having therein a collet operating tube and having a sleeve on the spindle carrying a circular series of toggle-formed collet operating means, each comprising a pair of opposed spaced members shiftable relative to each other and having the faces thereof opposed to each other formed one as a tapered cam face and the other with a substantially circular recess forming a socket, a toggle link having an enlarged end complemental to said circular recess and rotatably carried therein, thereby forming a toggle joint and having at its opposite end a roller engaging said tapered cam face, and shiftable means having a cam for engaging said roller at an angle to said opposed faces and effective to depress the roller along the tapered cam, thereby straightening the toggle and operating the chuck or collet.

4. A finger holder for a chuck or collet-carrying spindle having therein a collet operating tube and having a sleeve on the spindle, said sleeve having a circular series of recesses for the reception of a circular series of toggle formed operating means, each comprising a pair of opposed spaced members shiftable relative to each other and formed one as a tapered cam face and the other with a substantially circular recess forming a socket, a toggle link having an enlarged end complemental to said circular recess and rotatably carried therein, thereby forming a toggle joint and having at its opposite end a roller engaging said tapered cam face, and a shiftable sleeve on said toggle carrying sleeve and having a cam for engaging said roller at an angle to said opposed faces and effective to depress the roller along the tapered cam, thereby straightening the toggle and operating the chuck or collet, and means carried by the collet tube for adjusting the socketed member thereby to adjust the pressure exerted on the chuck or collet.

5. A finger holder for a chuck or collet-carrying spindle and comprising a pair of opposed spaced members, one a fixed member and the other a shiftable member, the fixed member having a tapered cam face and the shiftable member having a substantially circular recess forming a socket, said cam face and socket opposed to each other, a toggle link having an enlarged end complemental to said circular recess and rotatably carried therein, thereby forming a toggle joint and having at its opposite end a roller engaging said tapered cam face, and shiftable means having a cam for engaging said roller at an angle to said opposed faces and effective to depress the roller along the tapered cam, thereby straightening the toggle and operating the shiftable socket carrying member to operate the chuck or collet.

ALFRED E. DRISSNER.